April 14, 1959 — J. S. WOODWARD — 2,881,632
ENGINE CONTROL COORDINATOR
Filed Sept. 30, 1954 — 4 Sheets-Sheet 1
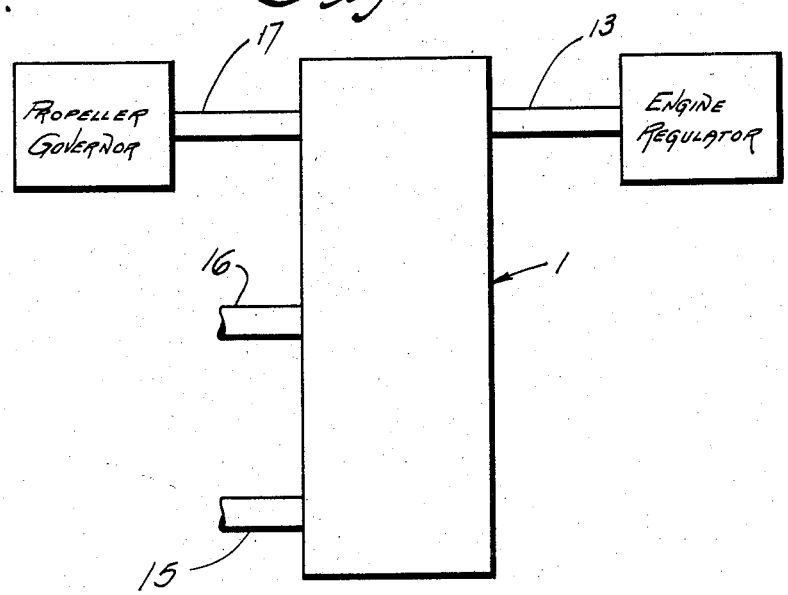
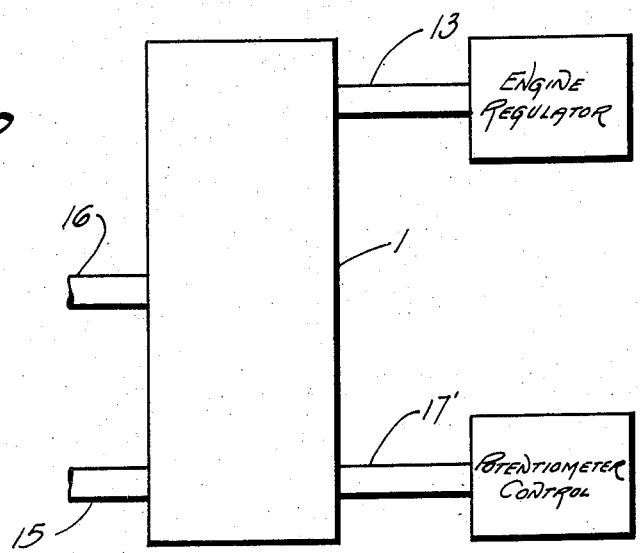
INVENTOR.
JAMES S. WOODWARD April 14, 1959

J. S. WOODWARD 2,881,632

ENGINE CONTROL COORDINATOR

Filed Sept. 30, 1954

INVENTOR.
JAMES S. WOODWARD
BY
ATTORNEYS

INVENTOR.
James S. Woodward

April 14, 1959　　　J. S. WOODWARD　　　2,881,632
ENGINE CONTROL COORDINATOR

Filed Sept. 30, 1954　　　　　　　　　　4 Sheets-Sheet 4

INVENTOR.
JAMES S. WOODWARD
BY
ATTORNEYS

United States Patent Office 2,881,632
Patented Apr. 14, 1959

2,881,632

ENGINE CONTROL COORDINATOR

James S. Woodward, West Hartford, Conn., assignor, by mesne assignments, to the United States of America as represented by the Secretary of the Navy Application September 30, 1954, Serial No. 459,570

1 Claim. (Cl. 74—471)

This invention relates to improvements in the control means for the propeller and power plant of a dirigible structure such as aircraft or water craft. The invention has particular reference to a means for automatically setting the propeller pitch regulator according to a predetermined relationship between it and the engine regulator.

It is an object of this invention to provide a relationship between engine output and propeller pitch in accordance with a predetermined schedule.

It is another object of this invention to provide a control means for the power plant and propeller pitch wherein during conditioning of the engine, the propeller governor will not vary when the engine regulator is actuated in the range from "condition" to operational idle.

It is still another object of this invention to provide a means to coordinate the regulation of a controllable pitch propeller and the regulation of the propulsion machinery of an air or water craft.

It is a further object of this invention to provide a linkage for controlling a propeller governor and the output of an engine which permits coordination of the engine operation with the means varying the setting of the propeller governor.

It is a still further object of this invention to provide a coordinating means which utilizes a pair of cams for controlling its output and a pair of input means connected to the output cams by linkage which permits one cam to move in response to both inputs and the other cam to move in response to only one of the inputs.

Other objects and many of the attendant advantages of this invention will be readily appreciated as the same becomes better understood by reference to the following detailed description when considered in connection with the accompanying drawings wherein:

Figure 1 is a schematic view of the controller mechanism showing its relation to the engine regulator and propeller governor.

Figure 2 is a view similar to Figure 1 showing a modified arrangement.

Figure 3:
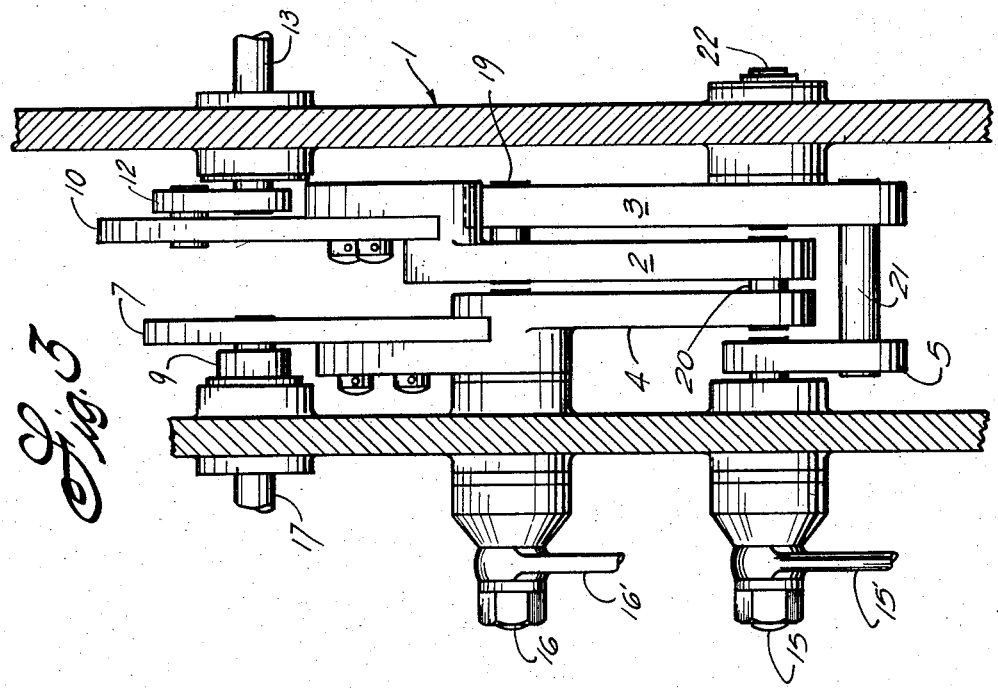
Figure 3 is a side view of the controller mechanism with a side of housing taken away to show the interior construction.

Figure 1 shows a coordinator or controller 1 positioned in relation to the engine regulator and propeller governor of propelled dirigible structures such as an aircraft or a ship. The controller is provided with two input means 15 and 16, two output means 13 and 17 and a linkage, to be described below so that the settings of the engine regulator and the propeller governor, which controls the propeller pitch, can be coordinated and set in accordance with a predetermined schedule.

An alternative arrangement is shown in Figure 2 wherein the potentiometer control of an electronic propeller governor is set by the output shaft 17' and the engine regulator is set by the output shaft 13. The linkage for accomplishing the desired results in this arrangement is similarly described below.

The function of the engine is controlled by the condition or input shaft 15 and by the power or input shaft 16. Each of these input shafts is provided with a suitable crank or hand wheel 15' and 16' respectively whereby they can be rotated in the journals mounting them in the side wall of the housing. The condition shaft 15 determines the engine setting from cutoff to operational idle and can be rotated only in a clockwise direction from the position shown in Figure 4, and as will be explained below. The power shaft 16 determines the engine and propeller settings from operational idle to maximum engine power and can be rotated only in a counterclockwise direction as seen in Figures 3 to 7 and as will be explained below.

The coordinating control means comprises a housing 1 with side and end walls. Journaled in a side wall is the condition shaft 15 and secured on its end for rotation therewith is a lever 5 disposed at an angle to the longitudinal angle of the shaft. A pin 21 is fixedly secured in the lever 5 and extends toward the opposite side of the housing and is secured in the angularly disposed foot 3' of a bell crank 3. The bell crank 3 at the point of junction of its foot 3' and its vertical extension is mounted on the pivot 22 in a wall of the housing. At its upper end the bell crank 3 carries a pin 19 which passes through the upper end of a lever or arm 2 mounted on the pin 19 for pivoting movement. A pin 20 connects the lower end of the lever 2 with the lower end of a lever or arm 4. The levers 2 and 4 are each mounted on the pin 20 so that they may have pivoting movement relative thereto. The power or input shaft 16 is journaled in a side wall of the housing above the shaft 15 and has the upper end of lever 4 fixedly connected thereto. When the controller occupies the position shown in Figure 4, the pivot 19 is collinear with the shaft 16 and the pivot 20 is collinear with the shaft 15 and pivot 22.

Mounted on the upper end of the lever 4 by screws or other suitable means 7' is a slotted cam. Riding in the cam slot is the roller or cam follower 8 which is connected by the crank arm 9 to the output shaft 17. The output shaft 17 is journaled in a side wall of the housing and sets the propeller governor in accordance with its rotation by the crank arm 9.

A slotted cam 10 is mounted on the upper end of the lever 2 by the screws or other suitable means 10'. A roller or cam follower 11 rides in the slot and is connected by the crank arm 12 to the output shaft 13. The output shaft regulates the setting of the engine regulator in accordance with its rotation in a side wall of the housing by the crank arm 12.

*Operation*

Figure 4:
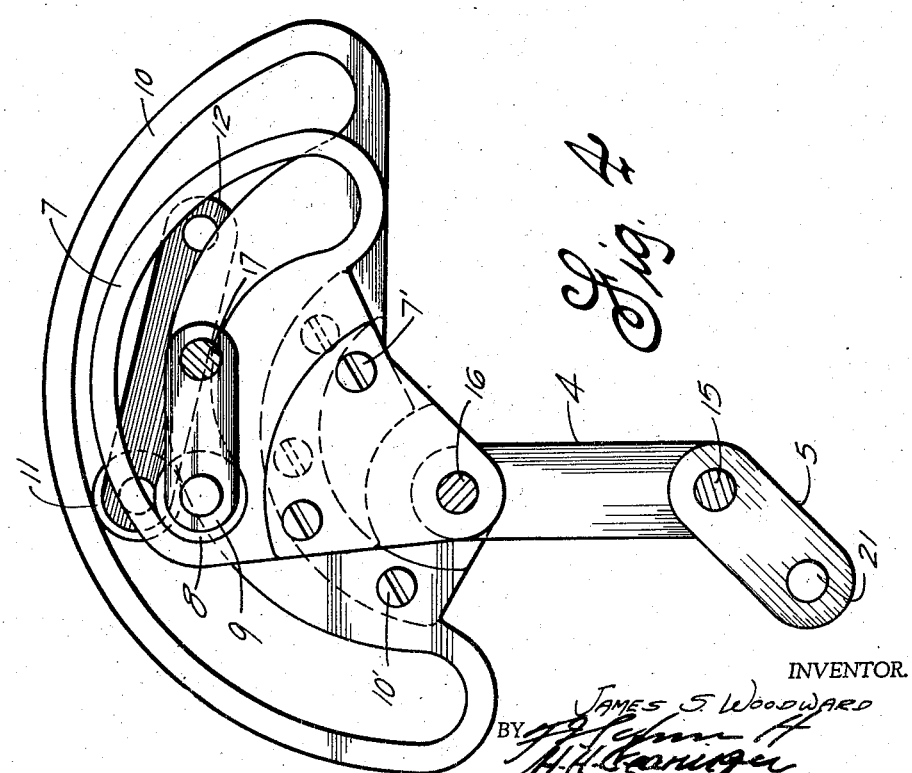
Figure 4 is an end view of the controller linkage with an end of the housing removed wherein the controller occupies its operational idle position.
Figure 6:
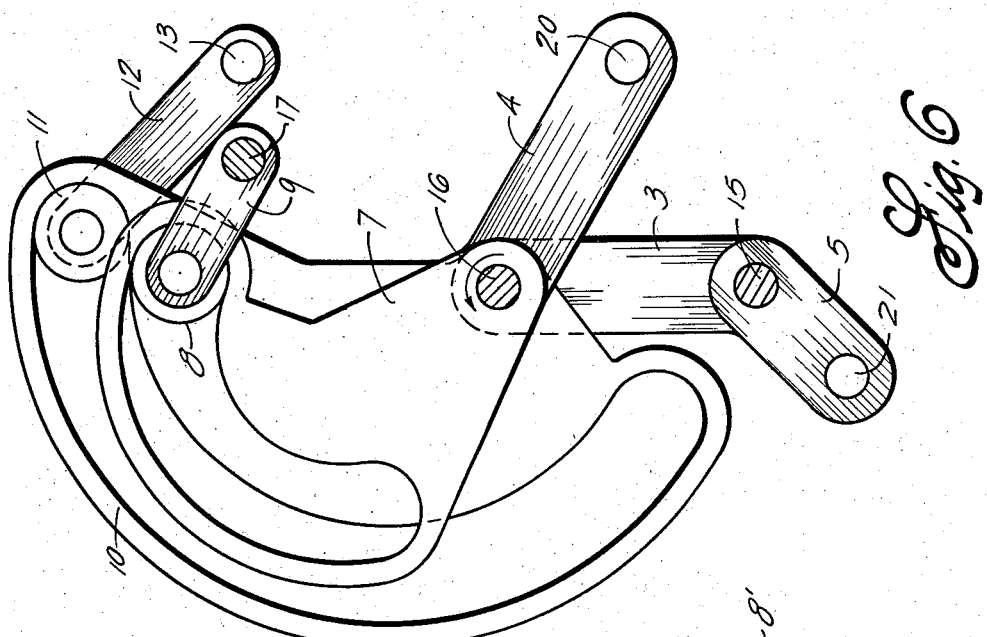
Figure 6 is a view similar to Figure 4 showing the linkage of Figure 4 rotated to a "power" position.
Figure 7:
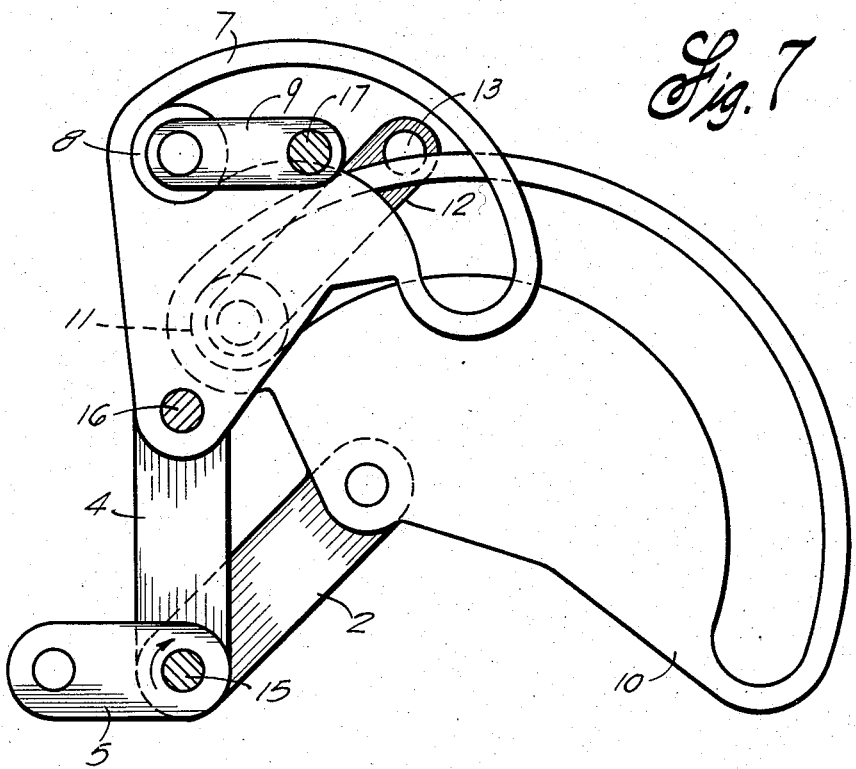
Figure 7 is a view similar to Figure 4 showing the linkage rotated to a cutoff position.
Figure 8:
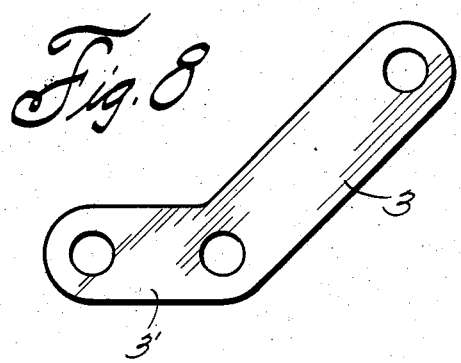
Figure 8 is a side view of the details of one of the levers.

To control the engine from cutoff to operational idle, the shaft 15 is turned in a counter-clockwise direction from the cutoff position shown in Figure 7. The lever 5 fixedly connected therewith rotates in the same direction pulling the pin 21 along. This causes the bell crank 3 to rotate in a similar direction about the pivot 22. Since the upper end of the bell crank 3 is pin connected to the upper end of lever 2, it causes this latter lever and the cam 10 to pivot about the pin 20 in the same direction. In Figure 4, it will be seen that this movement has caused the crank 12 to rotate clockwise, rotating the shaft 13 in the same direction. During this movement, there has been no movement of the lever 4 and cam 7, for no variation is desired in propeller pitch during the conditioning of the engine. It is to be noted that while the levers and cams are in the position shown in Figure 7, it is not possible to rotate the shaft 16 in its counter-clockwise direction since the levers 2 and 4 lock together, preventing such movement.

The controlling of the engine and propeller pitch from operational idle to maximum power is accomplished by rotating the shaft 16 counter-clockwise from the position shown in Figure 4. This causes the lever 4, fixed to the shaft, to rotate in the same direction while the pin 20 pulls the lower end of the lever 2 along, causing this latter lever to rotate about the pivot 19. Thus both cams assume the position shown in Figure 6, or some intermediate position and the cranks 9 and 12 each rotate clockwise to position both the propeller governor and the engine regulator. With the cams in this position, the shaft 15 cannot be turned as the lever 2 and the bell crank 3 will lock together preventing such movement.

The settings of the propeller governor and engine regulator are determined by the shape of the slots in the cams. Thus by selecting cam slots of varying shape, the relative movements of the output shafts 13 and 17 may be varied as desired. In the form of the invention in Figures 3, 4, 6 and 7, the power schedule is on the right hand side of cam 10 while the condition schedule is on the left hand side.

Figure 5:
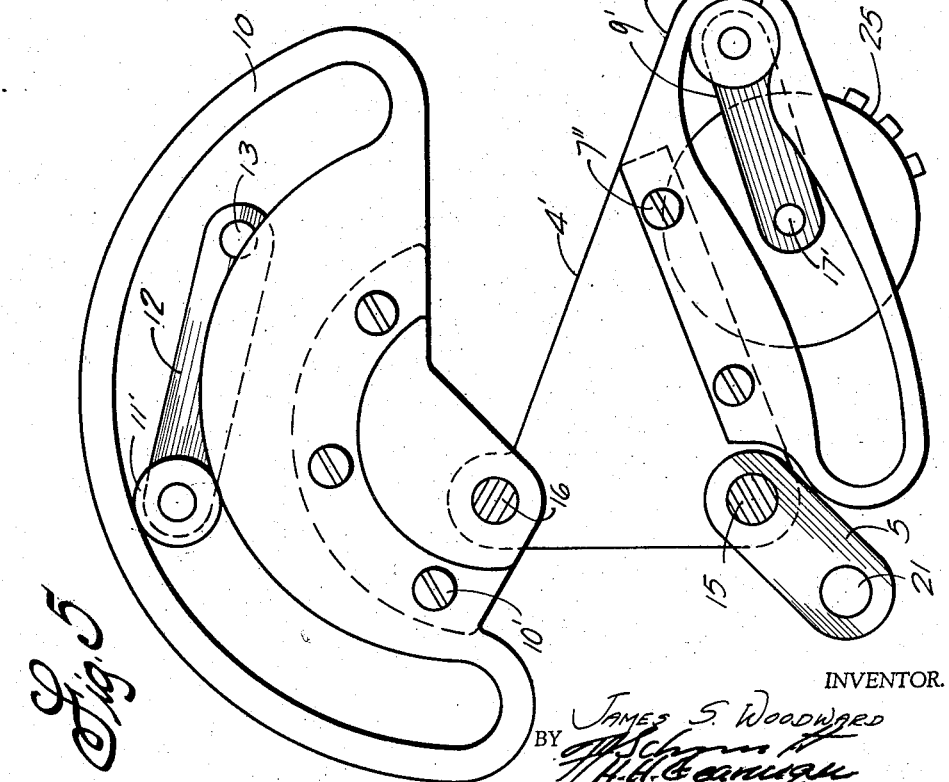
Figure 5 is a view similar to Figure 4 showing the modified arrangement of Figure 2.

In the modified arrangement of Figures 2 and 5, the construction is the same as above except that the arm 4' carries a cam 7' off to one side and at its lower end. The cam follower 8' rotates the crank arm 9' connected to the output shaft 17', which rotates in a side wall of the housing and sets the potentiometer 25 of an electronic propeller governor.

While the control and coordinating mechanism has been disclosed in conjunction with an engine regulator and a propeller governor, it is to be understood that this is not intended as a limitation for the device. It may be utilized wherever it is desired to have a control and coordinating means. The cams may be varied, both as to shape and type and positioned wherever on the links or arms it is desired to do so.

Obviously many modifications and variations of the present invention are possible in the light of the above teachings. It is therefore to be understood that within the scope of the appended claim the invention may be practiced otherwise than as specifically described.

What is claimed is:

Apparatus for coordinating control of a propeller drive means and a propeller pitch mechanism said apparatus comprising a support structure; a first input shaft rotatably mounted on the support structure; a first lever fixedly secured to said first shaft; cam means fixedly secured to one end of said first lever; a propeller pitch control output shaft rotatably mounted on the support structure; means responsive to rotary movement of the cam means about the axis of the first input shaft for controlling angular displacement of the propeller pitch output shaft; a bell crank rotatably mounted on the support structure; means engaging said bell crank for controlling its rotary disposition on the support structure; a second lever pivotably mounted on one end of the bell crank; cam means fixedly secured to one end of said second lever; a propeller drive control output shaft rotatably mounted on the support structure; means responsive to rotary movement of the cam means on the second lever for controlling angular displacement of the propeller drive output shaft; and means pivotably interconnecting the other end of the first lever and the other end of the second lever, said apparatus being so constructed and arranged that when the said first and second levers occupy a predetermined angular disposition the pivotal connection of the second lever on the bell crank is collinear with the axis of the first input shaft and the pivotal connection between the said first and second levers is collinear with the pivotal connection of the bell crank on the support structure.

References Cited in the file of this patent
UNITED STATES PATENTS

| | | |
|---|---|---|
| 918,680 | Krause | Apr. 20, 1909 |
| 1,789,483 | Wait | Jan. 20, 1931 |
| 2,052,764 | Harrison | Sept. 1, 1936 |
| 2,124,756 | Staples | July 26, 1938 |
| 2,154,887 | Baker | Apr. 18, 1939 |
| 2,268,601 | Knox | Jan. 6, 1942 |
| 2,336,844 | Buck | Dec. 14, 1943 |
| 2,447,469 | Spraragen | Aug. 17, 1948 |
| 2,525,501 | Taylor | Oct. 10, 1950 |
| 2,545,205 | Hill et al. | Mar. 13, 1951 |
| 2,579,959 | Petersen | Dec. 25, 1951 |
| 2,604,796 | Freese | July 29, 1952 |
| 2,616,508 | Mack | Nov. 4, 1952 |
| 2,638,993 | Woodward | May 19, 1953 |
| 2,667,228 | Wood et al. | Jan. 26, 1954 |
| 2,828,768 | Adams | Apr. 1, 1958 |